(12) United States Patent
Cikalo et al.

(10) Patent No.: US 6,470,256 B1
(45) Date of Patent: Oct. 22, 2002

(54) FUEL ECONOMIZING CRUISE CONTROL

(75) Inventors: James T. Cikalo, Farmington Hills, MI (US); Steven C. Tengler, Grosse Pointe Park, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/645,941

(22) Filed: Aug. 25, 2000

(51) Int. Cl.[7] ................................................ B60K 31/02
(52) U.S. Cl. ............................ 701/93; 701/94; 123/350
(58) Field of Search ............................ 701/93, 94, 123; 123/349, 350

(56) References Cited

U.S. PATENT DOCUMENTS

| | | | |
|---|---|---|---|
| 4,914,597 A | 4/1990 | Moncelle et al. ...... | 364/426.04 |
| 5,021,958 A | 6/1991 | Tokoro .................. | 364/426.04 |
| 5,944,766 A | 8/1999 | White ......................... | 701/94 |
| 6,076,036 A | * 6/2000 | Price et al. .................... | 701/93 |
| 6,128,570 A | * 10/2000 | Akhteruzzaman ............ | 701/93 |

* cited by examiner

*Primary Examiner*—Michael J. Zanelli
(74) *Attorney, Agent, or Firm*—Larry I. Shelton (57) ABSTRACT

A cruise control has a throttle controller for maintaining the speed of a vehicle at a desired speed. The cruise control can operate in a conventional cruise mode and a fuel economy cruise mode. When in the fuel economy cruise mode, the throttle is held at a fixed position as the vehicle travels within a prescribed range of speeds from the desired speed. The throttle remains fixed until an exit condition occurs or acceleration/deceleration input is supplied at which point the cruise control provides throttle adjustment at less than normal rates.

19 Claims, 5 Drawing Sheets

FUEL ECONOMIZING CRUISE CONTROL

CROSS-REFERENCE TO RELATED APPLICATIONS (Not applicable)

STATEMENT REGARDING FEDERALLY SPONSORED RESEARCH/DEVELOPMENT (Not applicable)

BACKGROUND OF THE INVENTION

The present invention relates to electronic throttle controllers for vehicles and in particular to such controllers providing automated speed control.

Electronic throttle controllers are well known for operating an engine throttle valve to control the rate of fuel flow to the combustion chamber of an engine. Typically, the throttle controller receives an acceleration input signal from the operator of the vehicle via an accelerator pedal. The farther the pedal is depressed, the more the throttle valve is opened, which permits more fuel to be consumed by the engine and the vehicle to travel faster.

Some throttle controllers can operate automatically as a "cruise control" to maintain the speed of the vehicle at a cruising speed set by the driver. The cruise control provides a convenient means for a driver to maintain vehicle speed without using foot pedals, which can be especially advantageous on long trips. Typically, such cruise controls use an input from a speedometer or engine speed sensor to monitor the cruising speed of the vehicle. Due to varying terrain, friction and wind resistance the speed controller is nearly continuously correcting for deviations from the desired speed. Consequently, the throttle is constantly fluctuating to allow more or less fuel to be consumed by the engine to maintain the set speed.

A problem with such cruise controls is that the continuous throttle adjustments lower the fuel economy of the engine. This is primarily due to the inefficiencies involved with non-constant burning, which include counteracting momentum losses of the moving components of the engine as well as that of the overall vehicle.

Most cruise controls include stored error correction algorithms that define the response time and duration of the throttle adjustments. These algorithms are commonly designed with smoothness, accuracy and responsiveness being the highest priorities. Fuel economy is typically not a factor in the design of the algorithms.

Yet, U.S. Pat. No. 5,944,766 discloses a cruise control having control algorithms designed to improve the fuel economy of the vehicle. When it is sensed that the vehicle is gaining momentum, the algorithms instruct the speed controller to override the normal control of the throttle and set back the throttle position to a prescribed percentage (such as 50% or 80%) of its normal position. Thus, fuel consumption is minimized during and after the vehicle travels down hill. As such, the disclosed cruise control has only limited fuel saving benefits.

Accordingly, there exists a need for a cruise control with improved fuel economizing benefits.

SUMMARY OF THE INVENTION

The present invention provides a vehicle cruise control with a fuel economy cruise mode that reduces the amount of fuel consumed by the vehicle. In the fuel economy cruise mode, the cruise control eliminates changes in engine throttling within a given deviation from the desired cruising speed. Moreover, the cruise control can provide initial throttle adjustment at less than normal rates during and when exiting the fuel economy cruise mode. Thus, the present invention reduces fuel costs and exhaust emissions into the environment Specifically, the present invention provides a cruise control designed for use with engines having an electronically controlled throttle valve movable to regulate fuel flow to the engine. The cruise control has an electronic control module electrically coupled to the throttle for controlling the position of the throttle valve and an input device operable from within a passenger cabin of the vehicle for signaling the control module of a speed signal corresponding to a desired vehicle speed to be maintained. The control module enters a fuel economy cruise mode and fixes the position of the throttle valve when the speed set signal is received and the vehicle speed is within a prescribed error range from the desired vehicle speed for a prescribed time period. The control module maintains the fixed position of the throttle valve until an exit condition or an acceleration/deceleration input is detected.

In a preferred form, the control module includes an input module, a memory module and a processor electrically coupled together. The prescribed error range and time period are stored in memory. Preferably, the prescribed error range two miles per hour and the prescribed time period is 10–30 seconds. Upon detecting an exit condition (or acceleration input), the control module can provide initial or sustained speed adjustment set backs, or in other words, less than normal acceleration and deceleration.

In one preferred form, the cruise control can also operate in a conventional cruise mode, activated by the input device, in which the control module repositions the throttle valve at prescribed intervals to maintain the desired vehicle speed according to speed adjustment gains of cruise control algorithms. When an exit condition is detected, the speed control module repositions the throttle valve so as to limit the rate of change of vehicle speed to less than the rate of change of speed ordinarily allowed during cruise mode. Additionally, the input device can send acceleration/deceleration signals to the control module, in which case, the control module repositions the throttle valve according to algorithms having reduced speed adjustment gains from that of the cruise mode algorithms. Preferably, the reduced speed algorithms are stored in the memory module.

The cruise control can also include an engine speed sensor coupled to the control module for sending the control module current vehicle speed data. The control module can be electrically coupled to a transmission clutch, a brake and a battery of the vehicle. For such a vehicle, the exit conditions can include, among others, an off input signal, a low speed input, a brake input signal, a clutch activation signal, a low battery signal and combinations thereof.

The present invention also provides a method of reducing the fuel consumption of an vehicle having a cruise control with a control module operated by an input device mounted within a passenger cabin of the vehicle. The method includes receiving operator inputs for a desired vehicle speed and to a begin fuel economy cruise mode; verifying that the vehicle is traveling within a prescribed range of the desired vehicle speed for a prescribed time period; entering a fuel economy cruise mode and fixing the position of the throttle; checking for an exit condition and acceleration/deceleration input; and maintaining the throttle at the fixed position until either the exit condition or acceleration/deceleration input is detected.

The method can further include the step of reducing vehicle acceleration and deceleration input from the operator when exiting fuel economy cruise mode. Preferably, this is done by the control module processor processing speed adjustment algorithms stored in the memory module to reduce the vehicle acceleration/deceleration rate during and when exiting the fuel economy cruise mode.

Thus, the present invention provides a cruise control using less fuel than conventional cruise controls, thereby reducing fuel costs and exhaust emissions into the environment. During fuel economy cruise mode all engine throttling is eliminated when the vehicle is traveling withing a range of the desired speed. Moreover, the cruise control applies reduced acceleration gains when accelerating or decelerating while in the fuel economy cruise mode or when returning to the conventional manual or cruise modes.

A preferred embodiment of the invention is stated in the following description and illustrated in the accompanying drawings which form a part hereof. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
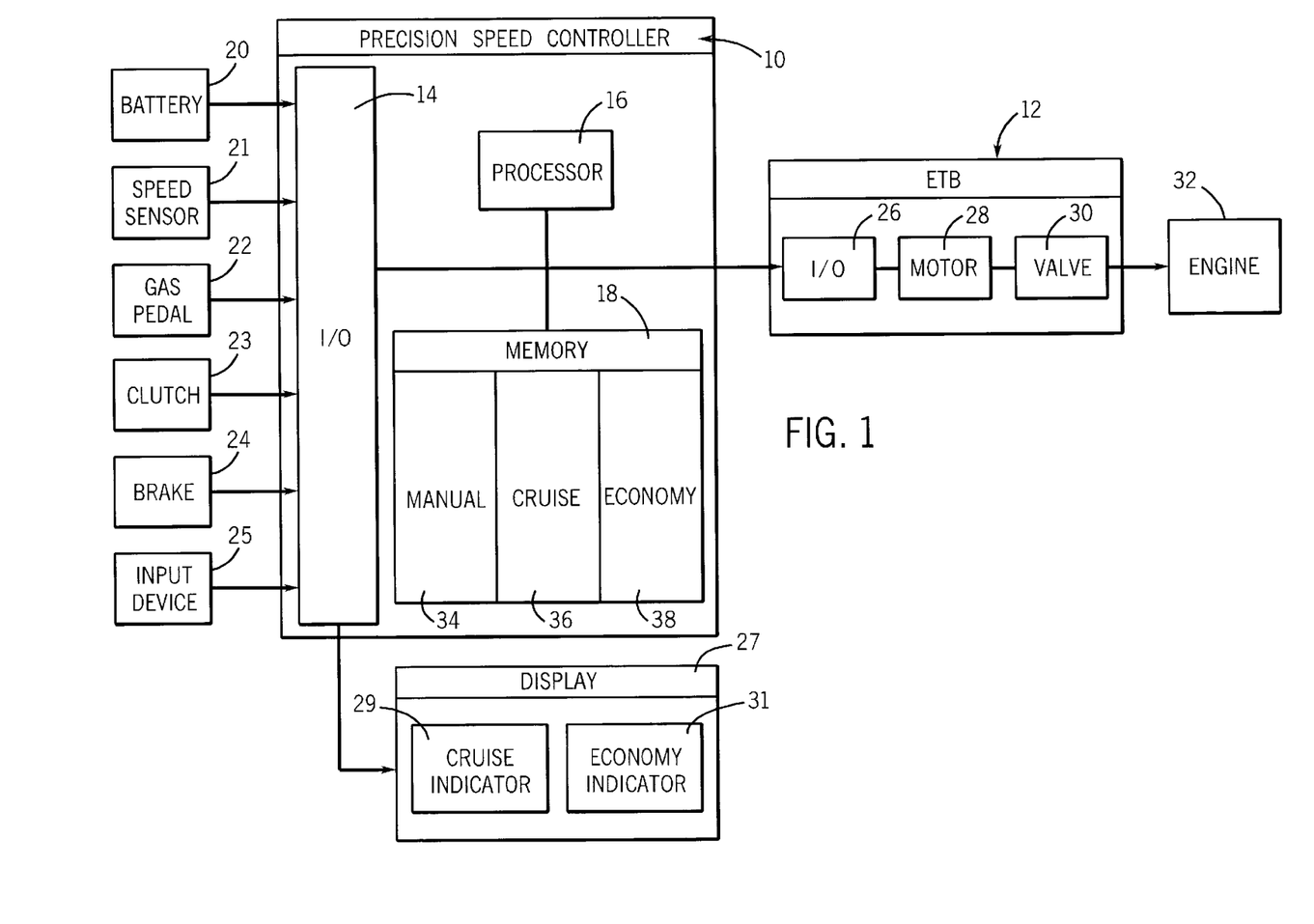
FIG. 1 is a block diagram of the cruise control system of the present invention.

Referring to FIG. 1, the present invention provides a vehicle cruise control system having an electronic precision speed controller (PSC) 10 controlling the operation of an electronic throttle body (ETB) 12. The PSC 10 includes an input/output (I/O) module 14, a microprocessor 16 and a memory module 18. These components are suitably coupled so that the PSC processor 16 can receive input signals from various vehicle components via the I/O module 14 and process them according to algorithms stored in the memory module 18 to operate the ETB 12. Such vehicle components include a battery 20, speed sensor 21, accelerator pedal 22, clutch 23, brake 24 and operator input device 25. The system also includes a display 27 with cruise mode 29 and fuel economy cruise mode 31 indicators that illuminate when the PSC 10 is operating in either of the cruise modes. The display 27 receives the appropriate signal from the PSC 10 via the I/O module 14. It should be noted that the vehicle components 20–25 and display 27 are shown having a separate wire connection to the PSC 10, however, they could also be connected together via a suitable vehicle bus using a suitable operating protocol, such as SCP (Standard Corporate Protocol).

The ETB 12 likewise includes an I/O module 26 for receiving control signals from the PSC 10 and for sending throttle feed back data to the PSC 10. The ETB 12 also includes a servomotor 28 and a throttle valve 30. The motor 28 is coupled to the throttle valve 30 by any suitable means, for example, a shaft and gear arrangement or a cable. The motor 28 is controlled by the PSC 10 to open and close the throttle valve 30 in response to acceleration and deceleration input from a vehicle operator received by the PSC 10. As known in the art, the throttle valve 30 controls the amount of fuel flowing to an engine 32 and thereby its operating speed and the overall speed of the vehicle.

The algorithms stored in the memory module 18 include instructions for operating the ETB 12 in three modes: manual mode, cruise mode and fuel economy cruise mode, with the algorithms for each mode stored in memory locations 34, 36 and 38, respectively.

Generally, the manual mode is the default operating condition wherein the driver controls the speed of the vehicle with the accelerator pedal and brake. In such a case, the PSC 10 operates the ETB 12 in response to accelerator pedal 22 and brake switch 24 input signals. The cruise mode is an automated engine throttle control wherein the driver inputs to the PSC 10 a cruising speed using a steering column mounted cruise control button 25. Once the desired cruising speed is set, the driver no longer needs to use the accelerator pedal, brakes or any other device to maintain the set speed of the vehicle. The fuel economy cruise mode is a fuel saving setting of the present invention wherein the vehicle speed is maintained within an acceptable deviation from the desired cruising speed, as described below.

The stored fuel economy algorithms provide instructions for entering, maintaining and exiting the fuel economy cruise mode. In the preferred embodiment, the PSC 10 is ready to enter fuel economy cruise mode only upon the coexistence of three conditions. First, the PSC 10 must already be in cruise mode. Second, the driver must supply a fuel economy cruise mode input. Third, the vehicle must be traveling at a substantially constant speed for a prescribed time. One additional requirement must also be met, and that is that no cruise mode exit condition is present.

Figure 2:
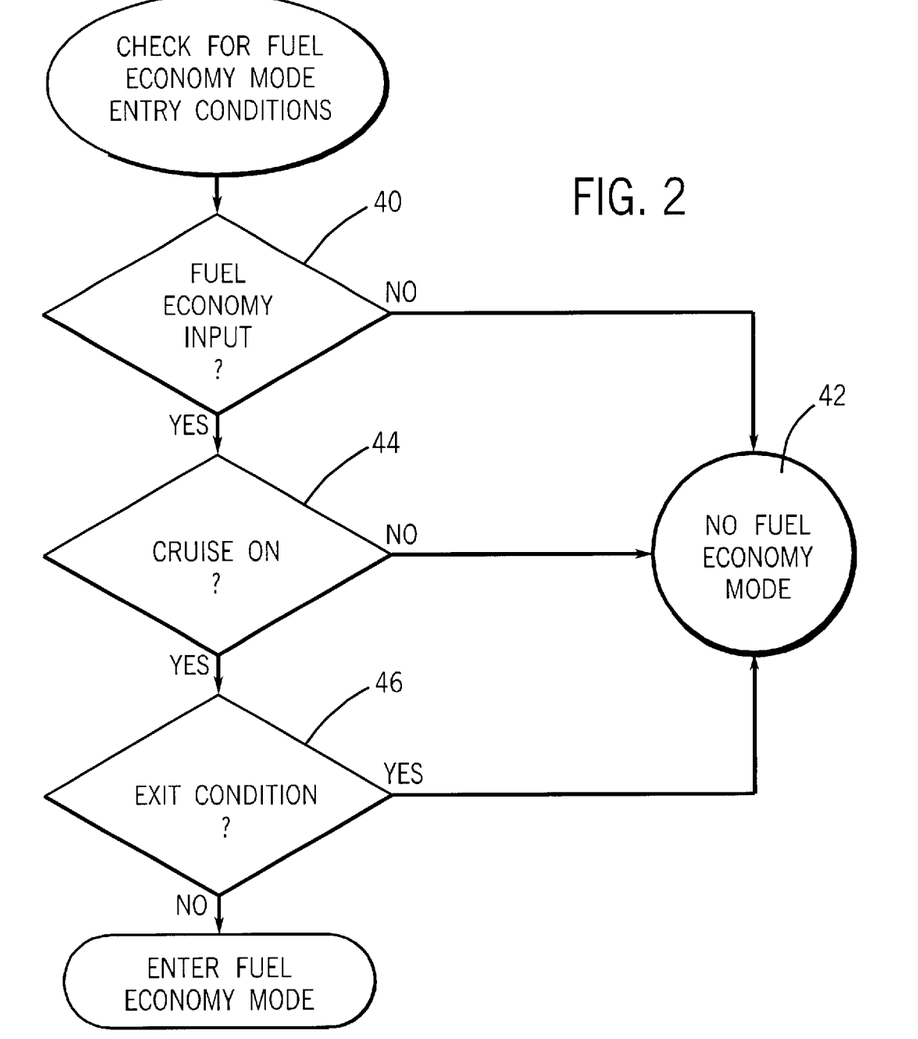
FIG. 2 is a flow chart showing a fuel economy cruise mode entry check process.

Thus, referring to FIG. 2, the PSC processor 16 executes a fuel economy cruise mode ready check subroutine either at periodic intervals, or preferably upon a suitable input from the vehicle operator. The subroutine begins at step 40 to check if a suitable input is received from the input device 25 indicating that the vehicle operator wishes to enter fuel economy cruise mode. This input can be a signal from a dedicated button or switch mounted within the passenger cabin or it can be the same button or switch used to initiate the cruise mode once in the cruise mode. If no such signal is received, the PSC 10 will remain in its present mode at step 42, otherwise at step 44 the PSC 10 confirms that it is currently in the cruise mode. If not, the PSC 10 can remain in the manual mode. Preferably, however, the PSC 10 will enter the cruise mode, notifying the driver via the display 27 in which case the process continues to step 46 where the PSC processor 16 scans the inputs from the devices 20–25 to confirm that no cruise mode exit conditions exist. The PSC 10 enters fuel economy cruise mode if there are no exit conditions, otherwise it returns to manual mode at step 42.

At step 46, to check for an exit condition, the PSC processor 16 scans the I/O module 14 to check for the presence of a signal from the devices 20–25, such as "off" input from the input device 25 in the vehicle cabin. The PSC processor 16 can also scan for an open circuit which could result when the battery is low (e.g. 8 volts or less), the brake is applied, or the clutch is depressed. The PSC 10 can also monitor engine speed using input from a suitable speed sensor 21 or a speedometer (not shown), and an exit condition can be when the vehicle slows below a prescribed minimum speed, for example 25 miles per hour. Any one of these conditions alone can constitute an exit condition. Any exit condition will cause the PSC 10 to exit the fuel economy cruise mode to return to cruise mode and possibly manual mode, depending upon the input received (such as on "off" or brake input).

Figure 3:
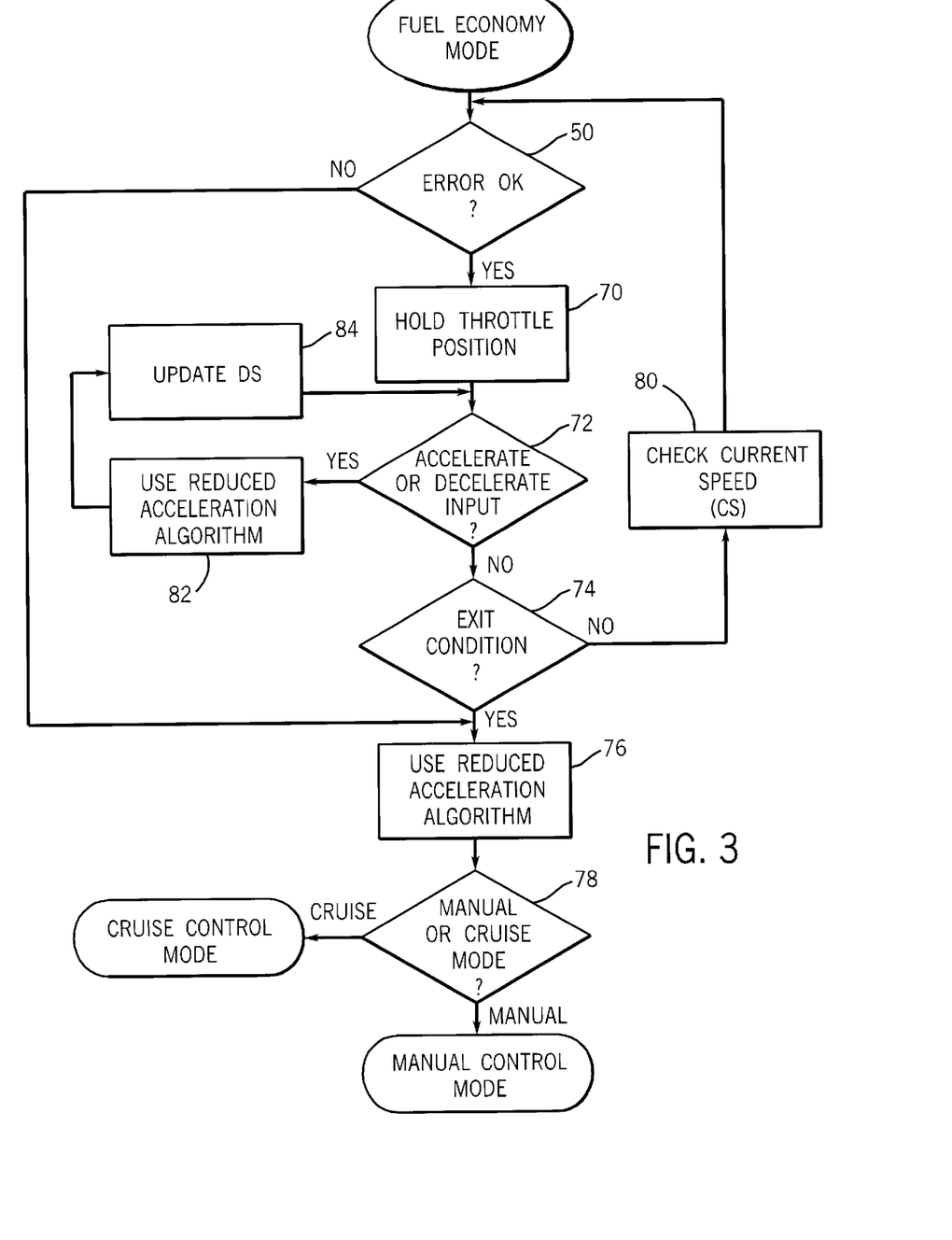
FIG. 3 is a flow chart showing the fuel economy cruise mode processes.

Once in the fuel economy cruise mode, the PSC 10 performs the process of FIG. 3. Specifically, at decision block 50, the PSC 10 determines whether the vehicle is traveling at a sufficiently constant speed for a given time period using the subroutine of FIG. 4 Referring to FIG. 4 a prescribed maximum speed error E(max) and time constant (Tc) are stored in a suitable location in the memory module 18 are retrieved at step 52. Also retrieved from the memory module 18 at step 52 is the driver's desired speed (DS), which is the vehicle speed when the cruise mode was entered. As an example, the stored values could be DS=55 miles per hour, E(max)=0.5 miles per hour, and Tc=30 seconds, in which case the vehicle speed would have to be within 54.5–55.5 miles per hour to enter fuel economy cruise mode.

Figure 4:
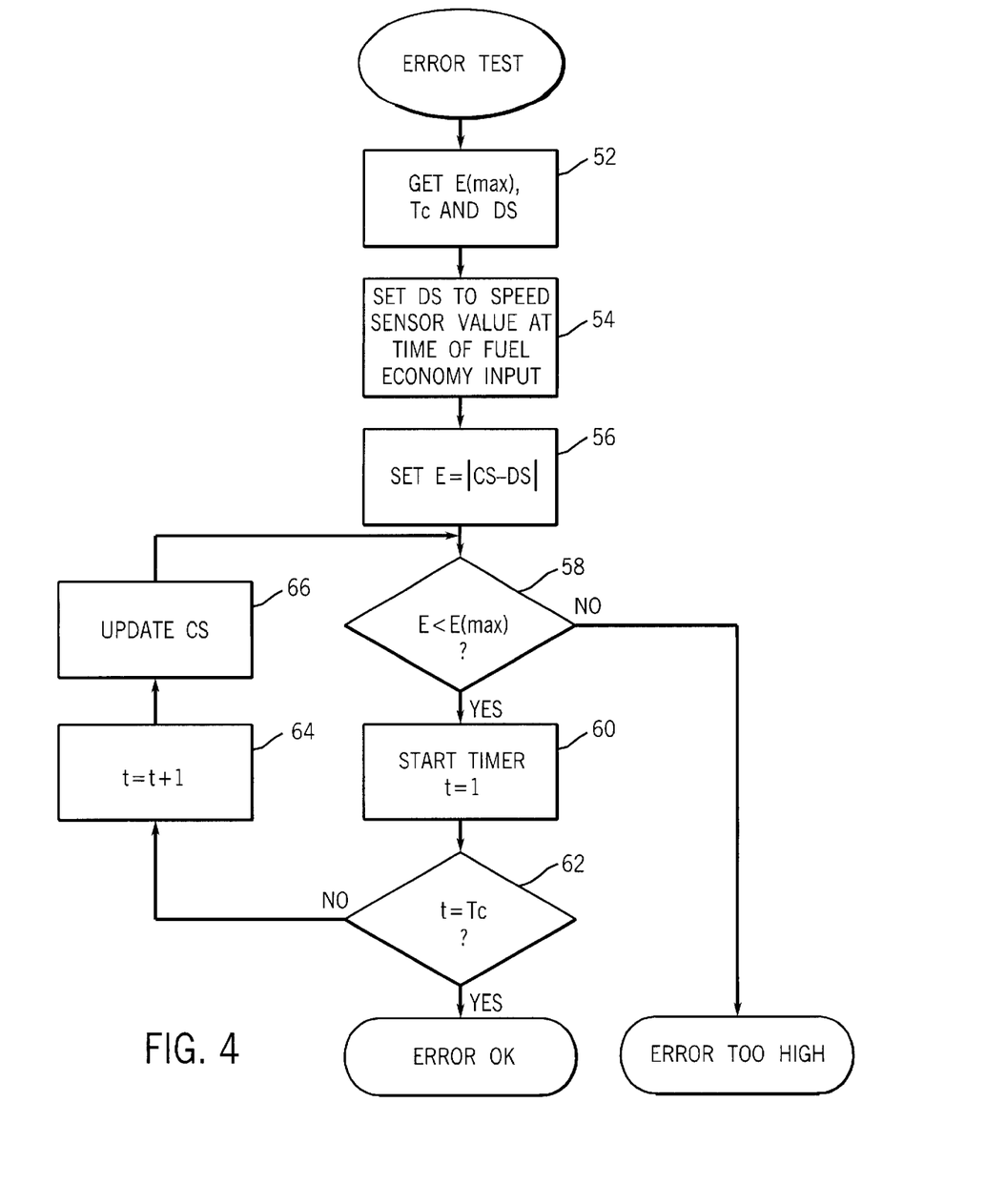
FIG. 4 is a flow chart showing the error checking process.

At step 54, the PSC 10 PSC processor 16 reads the value of the speed sensor 21 and sets a current speed (CS) value in the memory module 18 to the speed sensor value. Then at step 56 the PSC processor 16 computes the actual error (E) or difference between CS and DS (which is stored in the memory module 18). At step 58, the PSC processor 16 compares the absolute value of E to E(max). If E is less than E(max), then at step 60 the PSC processor 16 begins a timer count. If at step 62 the value of the timer is less than Tc, the counter is incremented at step 64. At step 66, the PSC processor 16 updates the value of CS according to the speed sensor and the computation of step 58 is again made. This continues until E is less than E(max) for Tc in which case the vehicle is traveling within the prescribed error, or until E is greater than E(max), in which case the vehicle is not traveling at a sufficiently constant rate.

Referring again to FIG. 3, if the vehicle is not traveling at a sufficiently constant rate, as step 68, the PSC 10 is returned to cruise mode using an algorithm with set back gains so as to limit the rate of change of the vehicle speed to less than the rate ordinarily allowed during the cruise mode. For example, a suitable algorithm would be that the throttle pull equals the present throttle pull plus some fraction (e.g. 40% of normal) of a cruise control error correction algorithm known in the art. The set back gain reduces power delivery requirements thereby improves fuel efficiency. Moreover, this prevents the vehicle from surging forward unexpectedly. Note that the reduced gain could be applied only for a prescribed time period after which the full value could be used.

On the first pass through the subroutine of FIG. 4, however, the error should be within acceptable limits because the cruise mode algorithms were making nearly constant throttle adjustments to maintain the vehicle speed at the desired speed. As such, at step 70, the PSC 10 signals the ETB 12 to hold the throttle valve 30 at its current position. In this way, the throttle valve 30 is not being repositioned so that the engine 32 is not fluctuating speed. Rather, the engine receives a steady flow of fuel and operates at a steady speed. This greatly reduces or eliminates energy losses from the changing momentum of the moving parts of the engine and the vehicle overall. This reduction in energy losses results in greater fuel economy, thereby making the vehicle less expensive to drive and less damaging to the environment.

The inventors of the present invention have conducted a study of a Ford Motor Company pick-up truck model F-150 using the speed control system of the present invention. The particular truck was driven under conventional cruise control and found to have an average fuel economy of approximately 20 miles per gallon. The results of the study indicated that the truck could travel approximately 0.5 miles farther per gallon of fuel while operating in fuel economy cruise mode. The inventors believe that with additional refinement of the fuel economy algorithms, the speed control system of the present invention could provide five percent or more savings in fuel consumption when the vehicle is operated in fuel economy cruise mode.

Referring still to FIG. 4, the fuel economy algorithms also instruct the PSC 10 with regard to acceleration and deceleration input from the driver. At step 72, the PSC processor 16 scans the I/O module 14 for such input. If there is no acceleration and deceleration input, at step 74 the PSC processor 16 determines if an exit condition (as described above) present. If an exit condition is present, then at step 76 the PSC 10 calls up the acceleration algorithms having set back gains, as mentioned above. At step 78, the PSC 10 then determines whether the exit condition (or error from step 50) requires it to enter manual or cruise mode. The PSC 10 returns to the proper mode using the set back gains. If at step 74 no exit condition is detected, the routine checks the speed sensor for the current speed at step 80 and loops back to step 50 continuing to hold the throttle position as long as the error is acceptable and no exit condition or acceleration input is detected.

If an acceleration/deceleration input was detected at step 72, then at step 82 the PSC processor 16 uses set back gains (e.g. 80% of normal) to gradually bring the vehicle to the new desired speed, and at step 84, the PSC 10 updates the desired speed value (DS) according to the acceleration/deceleration input. The acceleration/deceleration input can be via the foot pedal or an accelerate or coast button on the cruise control stem. Similarly, a resume input, common to conventional cruise controls, could also be a suitable input. The vehicle stays in fuel economy cruise mode until an exit condition, as described above, is detected.

Figure 5:
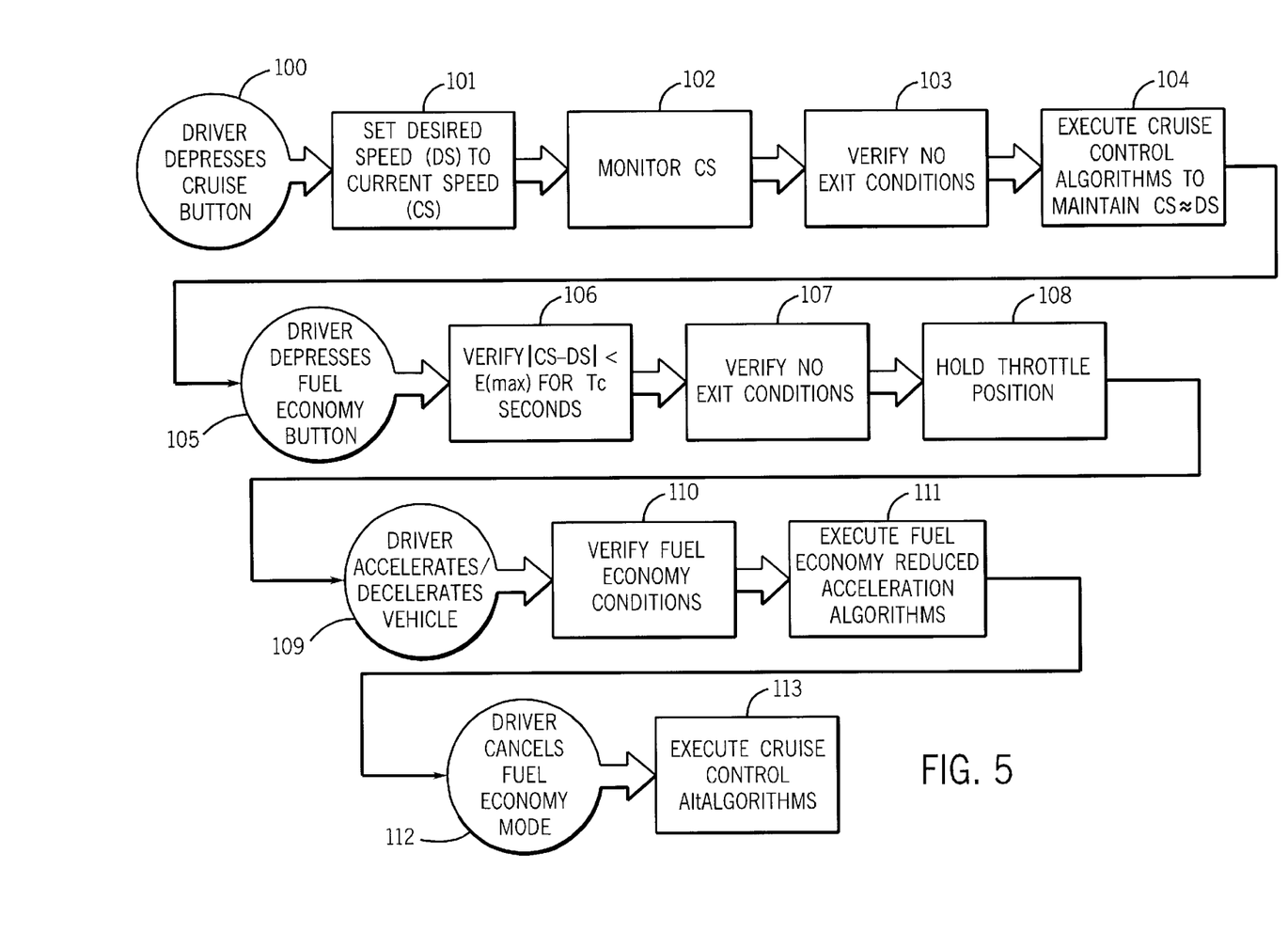
FIG. 5 is a process block diagram showing the cruise control response to various driver input conditions.

FIG. 5 illustrates the primary events (blocks 100, 105, 109 and 112) performed by the PSC 10 in response to input from the driver. Generally, blocks 101–104 represent activation of the cruise control mode, blocks 106-108 represent activation of the fuel economy cruise mode, blocks 110–111 represent acceleration and deceleration when in the fuel economy cruise mode and block 113 represents returning to the cruise control mode from the fuel economy cruise mode.

The block diagram of FIG. 5 assumes that the vehicle is initially being operated in manual speed control mode, when at block 100, the vehicle driver initiates a cruise mode input to the PSC 10, preferably via an "on" or "set speed" button of the input device 25 located on a turn signal stem or a steering wheel hub. As mentioned above, then at block 101 the PSC 10 stores in the memory module 18 as DS the current speed sensor value at the time of receiving the cruise mode input. At blocks 102 and 103, the speed sensor 21 is monitored and the input addresses of the other vehicle components are checked in the I/O module 14 to ensure that there are no relevant signals or open circuits indicating the presence of an exit condition. Then at block 104, the PSC processor 16 accesses the algorithms stored in the cruise mode location 34 (see FIG. 1). The PSC 10 uses these algorithms, which can be any cruise control algorithms well known in the art, to maintain the current speed substantially equal to the desired set speed. Generally, in the cruise mode the PSC 10 monitors the current speed of the vehicle and corrects for any deviation from the desired speed approximately every 50 milliseconds using a correction formula governing the rate and distance of throttle position adjustment. Ordinarily, such correction formulas are designed to provide for rapid acceleration and deceleration as needed to keep the vehicle traveling at the desired speed while at the same time providing a smooth change in speed so that the vehicle does not lurch forward or slow too suddenly.

As indicated by block 105, when the vehicle is traveling in cruise mode, the driver may activate the fuel economy cruise mode preferably by depressing the "cruise on" or "set speed" button a second time, however, a dedicated fuel economy cruise mode switch could also be used. At block 106, the PSC 10 verifies that the deviation from the desired speed is within the allowed error constant for the prescribed time period, as described above, and at block 107 that no exit conditions exist. Then, at block 108, the PSC 10 holds the throttle at its current position.

Once in fuel economy cruise mode, at block 109, the driver may accelerate or decelerate the vehicle by applying pressure to the gas pedal or brake pedal as well as by using an accelerate or coast switch on the input device 25 (see FIG. 1). In response to this input, at block 110 the PSC 10 confirms that no exit condition is present and at block 111 repositions the throttle as needed to obtain the new speed. The PSC 10 uses set back gains defined by the fuel economy algorithms. After the speed adjustment, the PSC 10 preferably resumes fuel economy cruise mode until an exit condition is detected, in which case the PSC 10 enters cruise or manual mode, until the fuel economy conditions are present so that fuel economy cruise mode is reactivated (as described above).

The driver can cancel the fuel economy cruise mode, at block 112, with a suitable input, such as depressing a "cruise off" switch in which case, at block 113, the PSC 10 returns to either cruise or manual mode.

Thus, the present invention provides an automated vehicle speed control using less fuel than conventional cruise controls, thereby reducing fuel costs and exhaust emissions into the environment. During fuel economy cruise mode operation all engine throttling is eliminated when the vehicle is traveling within an acceptable speed deviation from the desired speed. Moreover, the speed control system of the present invention applies reduced acceleration and deceleration gains while accelerating or deceleration in the fuel economy cruise mode or when returning to the conventional manual or cruise modes.

Illustrative embodiments of the invention have been described in detail for the purpose of disclosing a practical, operative structure whereby the invention may be practiced advantageously. However, the apparatus described above is intended to be illustrative only, and the novel characteristics of the invention may be incorporated in other structural forms without departing from the scope of the invention. For example, the values for the above mentioned constants are merely exemplary and other suitable values, higher or lower, could also be used. Accordingly, to apprise the public of the full scope of the invention, the following claims are made.

What is claimed is:

1. In a vehicle having an engine and an electronic throttle including a throttle valve movable to regulate fuel flow to the engine, a cruise control comprising:

an input device operable from within a passenger cabin of the vehicle to send a speed signal defining a desired vehicle speed to be maintained by the cruise control;

an electronic control module electrically coupled to the throttle for controlling the position of the throttle valve; and wherein the control module executes a stored program to enter a fuel economy cruise mode and fix the position of the throttle valve when the speed signal is received and a vehicle speed is within a prescribed error value from the desired vehicle speed for a prescribed time period, the control module maintaining the position of the throttle valve until one of an exit condition and acceleration input is detected.

2. The cruise control of claim 1, wherein the control module includes an input module, a memory module and a processor electrically coupled together.

3. The cruise control of claim 2, wherein the error value and time period are stored in the memory module.

4. The cruise control of claim 2, wherein the control module can also operate in a conventional cruise mode in which the throttle valve is repositioned at prescribed intervals to maintain the desired vehicle speed according to cruise control algorithms.

5. The cruise control of claim 4, wherein the cruise mode is activated by the input device.

6. The cruise control of claim 4, wherein when an exit condition is detected the control module repositions the throttle valve according to algorithms having reduced speed adjustment gains than the cruise control algorithms.

7. The cruise control of claim 6, wherein the input device can send acceleration and deceleration signals to the control module, wherein the control module repositions the throttle valve in response to the acceleration and deceleration signals according to algorithms having reduced speed adjustment gains than the cruise control algorithms.

8. The cruise control of claim 7, wherein the reduced speed adjustment algorithms are stored in the memory module.

9. The cruise control of claim 4, wherein the exit condition is selected from the group consisting of: an "off" input signal, a low speed input and combinations thereof.

10. The cruise control of claim 9, wherein the vehicle further includes a battery, a transmission clutch and a brake each being electrically coupled to the control module and wherein the exit condition is further selected from the group consisting of: a brake input signal, a clutch activation signal, a low battery signal and combinations thereof.

11. The cruise control of claim 2, further including an engine speed sensor coupled to and sending current vehicle speed data to the control module.

12. A method of reducing the fuel consumption of a vehicle having a cruise control including a control module operated by an input device mounted within a passenger cabin of the vehicle, the method comprising the steps of:

receiving operator inputs for a desired vehicle speed and to begin a fuel economy cruise mode;

verifying that the vehicle is traveling within a prescribed error range of the desired vehicle speed for a prescribed time period;

entering a fuel economy cruise mode and fixing the position of the throttle;

checking for an exit condition and an acceleration input; and maintaining the throttle at the fixed position until one of the exit condition and acceleration input is detected.

13. The method of claim 12, wherein the control module includes an input module, a processor and a memory module.

14. The method of claim 13, wherein the error range and time period are stored in memory.

15. The method of claim 14, further comprising the step of reducing vehicle acceleration and deceleration input from the operator.

16. The method of claim 15, wherein the processor processes speed adjustment algorithms stored in the memory module to reduce the vehicle acceleration and deceleration operator input.

17. The method of claim 12, wherein the cruise control further includes an engine speed sensor coupled to and sending current vehicle speed data to the control module.

18. The method system of claim 12, wherein the exit condition is selected from the group consisting of: an "off" input signal, a low speed input and combinations thereof.

19. The method of claim 18, wherein the vehicle further includes a transmission clutch, a brake and a battery each being electrically coupled to the control module and wherein the exit condition is further selected from the group consisting of: a brake input signal, a clutch activation signal, a low battery signal and combinations thereof.

* * * * *